US007274818B2

(12) United States Patent
Suzuki

(10) Patent No.: US 7,274,818 B2
(45) Date of Patent: Sep. 25, 2007

(54) IMAGE FORMING APPARATUS

(75) Inventor: Yuusuke Suzuki, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 743 days.

(21) Appl. No.: 10/805,282

(22) Filed: Mar. 22, 2004

(65) Prior Publication Data
US 2005/0225783 A1    Oct. 13, 2005

(51) Int. Cl.
*G06K 9/00* (2006.01)
(52) U.S. Cl. .................. 382/167; 382/162; 382/258; 358/1.9; 358/518; 358/529
(58) Field of Classification Search ............ 382/167, 382/162, 258; 358/1.9, 504, 518, 3.26, 540, 358/529
See application file for complete search history.

(56) References Cited

U.S. PATENT DOCUMENTS

| 5,331,440 | A | * | 7/1994 | Kita et al. ............... 358/529 |
| 5,490,225 | A | * | 2/1996 | Kumagai ................ 382/227 |
| 5,631,748 | A |   | 5/1997 | Harrington |
| 6,160,913 | A | * | 12/2000 | Lee et al. ............... 382/176 |
| 2002/0093671 | A1 |  | 7/2002 | Ohno |
| 2002/0118380 | A1 | * | 8/2002 | Krueger et al. ........... 358/1.9 |
| 2002/0124027 | A1 | * | 9/2002 | Krueger et al. ........... 707/528 |
| 2002/0196464 | A1 |  | 12/2002 | Kodama et al. |
| 2003/0095282 | A1 |  | 5/2003 | Suzuki et al. |

OTHER PUBLICATIONS

U.S. Appl. No. 10/310,955, filed Dec. 6, 2002, Suzuki.

* cited by examiner

*Primary Examiner*—Matthew C. Bella
*Assistant Examiner*—Ali Bayat
(74) *Attorney, Agent, or Firm*—Foley & Lardner LLP

(57) ABSTRACT

A CPU determines whether a generated low-level drawing command is associated with drawing of a gray object and a color value of the gray object is greater than a determination value. If the generated low-level drawing command is associated with drawing of a gray object and the color value of the gray object is greater than the determination value, the CPU executes an overprint drawing process wherein a minimum limit in number of pixels, which causes no defect in a fixing process, is set and a minimum necessary number of pixels are erased (i.e. thinned out).

12 Claims, 11 Drawing Sheets

Occurrence of white gaps in case of misregistration

FIG. 6

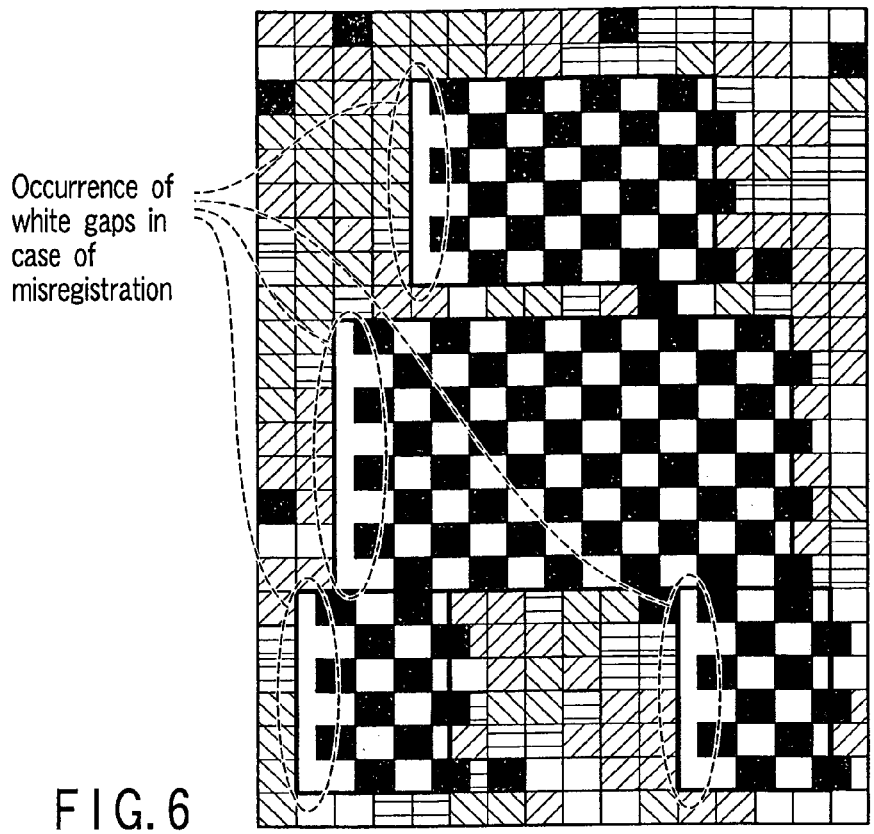

| Halftone | Print medium | Object kind | Thinning-out pattern |
|---|---|---|---|
| K0, Y45, M135, C230 | Normal paper | Character | Pattern 1 |
| | | Thin line | |
| | | Thick line | Pattern 2 |
| | | Solid | |
| | Thick paper 1 | Character | Pattern 1 |
| | | Thin line | |
| | | Thick line | Pattern 2 |
| | | Solid | |
| | Thick paper 2 | Character | Pattern 1 |
| | | Thin line | Pattern 2 |
| | | Thick line | Pattern 3 |
| | | Solid | |
| | Thick paper 3 | Character | Pattern 1 |
| | | Thin line | Pattern 2 |
| | | Thick line | Pattern 3 |
| | | Solid | Pattern 4 |
| | OHP | Character | Pattern 3 |
| | | Thin line | Pattern 4 |
| | | Thick line | |
| | | Solid | |
| K0, Y30, M165, C210 | Normal paper | Character | Pattern 5 |
| | | Thin line | |
| | | Thick line | Pattern 6 |
| | | Solid | |

FIG. 7

| Color conversion type | Print medium | Print direction | Size determination result | Thinning-out pattern |
|---|---|---|---|---|
| Saturation | Normal paper | Forward direction | Small | Pattern 1 |
| | | Forward direction | Large | |
| | | 90° rotation | Small | Pattern 5 |
| | | 90° rotation | Large | |
| | Thick paper 1 | Forward direction | Small | Pattern 2 |
| | | Forward direction | Large | |
| | | 90° rotation | Small | Pattern 5 |
| | | 90° rotation | Large | |
| Relative | Normal paper | Forward direction | Small | Pattern 6 |
| | | Forward direction | Large | |
| | | 90° rotation | Small | Pattern 5 |
| | | 90° rotation | Large | |

F I G. 16

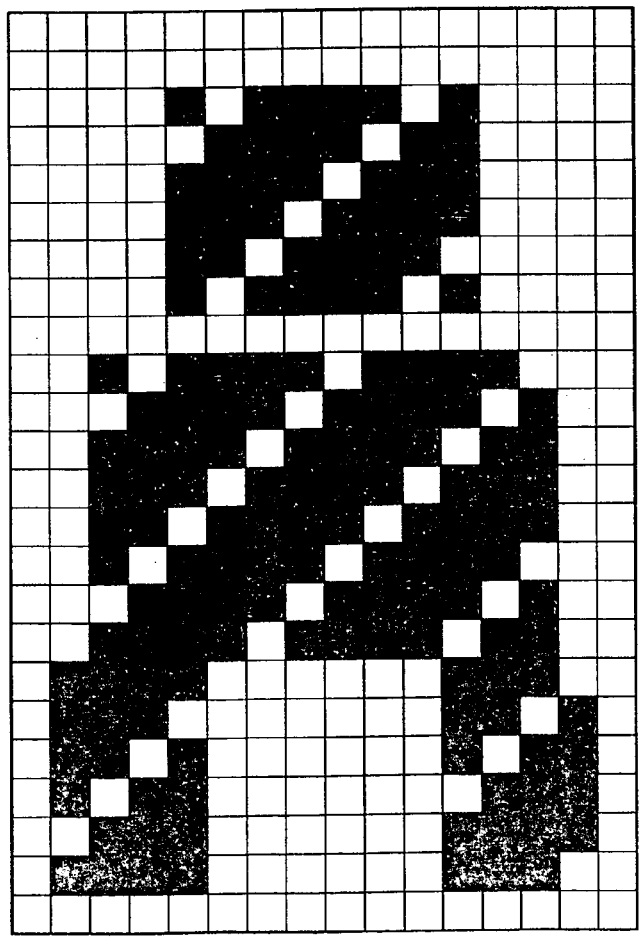

F I G. 18

IMAGE FORMING APPARATUS

BACKGROUND OF THE INVENTION

1. Field of the Invention

The present invention relates to an image forming apparatus that forms an image on the basis of PDL information.

2. Description of the Related Art

A trapping method (a print method wherein boundary portions of colors are made to overlap each other), an overprint method (a print method wherein the color of an object to be drawn is made to overlap another color) and a black overprint method (a print method wherein black is made to overlap another color) are known as methods of preventing occurrence of "white gap" due to misregistration of a black character, a black line, etc. in conventional image forming apparatuses.

An electrophotographic color printer forms a print image by overlapping four colors (Y, M, C, K). If misregistration in color takes place, an unsightly white gap occurs conspicuously on a high-density region, in particular, in the case of a black character on a dark background, or black graphic. One of measures to overcome this problem is a BOP (Black Over Print) process.

In the BOP process, a background region, which overlaps a black object, is not erased, and a neighboring background pattern is made to remain under the black object. Thus, exposure of the background due to misregistration is prevented. In the BOP process, the color to be processed is limited to black. However, a white gap due to misregistration is similarly conspicuous with respect to dark gray with high density, and the appearance of print matter becomes poor (degradation in image quality).

BRIEF SUMMARY OF THE INVENTION

The object of an aspect of the present invention is to provide an image forming apparatus and a program for an image forming apparatus, which can alleviate degradation in image quality resulting from white gaps occurring due to misregistration with respect to high-density dark gray, similarly with the case of black.

According to an aspect of the present invention, there is provided an image forming apparatus that forms a color image, comprising: determination means for determining whether image data of an object to be drawn is composed of gray data and a color value of the object is greater than a determination value; erase means for erasing, if the determination means determines that the image data of the object to be drawn is composed of gray data and the color value of the object is greater than the determination value, image data of a background region that overlaps a drawing region of the to-be-drawn gray object on the basis of a preselected erasure pattern; and drawing means for drawing the gray object using the image data of the background region that is erased by the erase means.

According to another aspect of the present invention, there is provided a program that causes an image forming apparatus, which forms a color image, to execute a process, comprising: determining whether image data of an object to be drawn is composed of gray data and a color value of the object is greater than a determination value; erasing, if it is determined that the image data of the object to be drawn is composed of gray data and the color value of the object is greater than the determination value, image data of a background region that overlaps a drawing region of the to-be-drawn gray object on the basis of a preselected erasure pattern; and drawing the gray object using the image data of the background region that is erased.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of an aspect of the invention.

FIG. 6 shows a result of drawing of a gray object in the normal drawing process;

FIG. 7 shows an example of a thinning-out pattern select table that is prepared;

FIG. 16 shows an example of decision of thinning-out pattern selection on a thinning-out pattern select table;

FIG. 18 shows an example of a gray object that is subjected to a half-tone process;

DETAILED DESCRIPTION OF THE INVENTION

Embodiments of the present invention will now be described with reference to the accompanying drawings.

Figure 1:
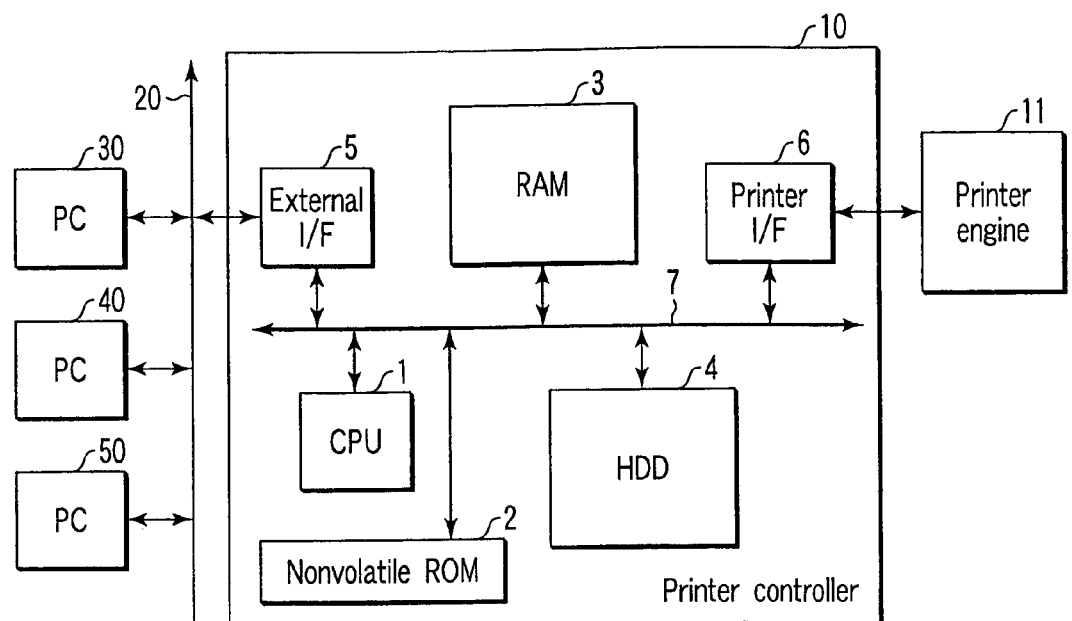
FIG. 1 is a clock diagram that schematically shows the structure of an image forming system according to the present invention.

FIG. 1 schematically shows the structure of an image forming system according to the present invention.

A printer controller 10 is connected to a printer engine (drawing means) 11.

The printer controller 10 is also connected to personal computers (PC) 30, 40 and 50 over a network 20.

Processing in this invention is executed as a program in the printer controller 10.

The printer controller 10 includes a CPU 1 that controls the entirety of the system, a rewritable nonvolatile ROM 2 that stores a program, etc., a RAM 3 that temporarily stores data, a hard disk drive (HDD) 4 that is used to store data, etc., an external interface (I/F) 5 for connection to the network 20, and a printer interface (I/F) 6 for connection to the printer engine 11. The CPU 1, nonvolatile ROM 2, RAM 3, HDD 4, external I/F 5 and printer I/F 6 are communicable over a communication bus 7.

In addition, the printer controller 10 is communicable via the external I/F 5 with the PCs 30, 40 and 50 that are connected to the network (transmission medium) 20. The printer controller 10 is communicable with the printer engine 11 via the printer I/F 6.

Figure 2:
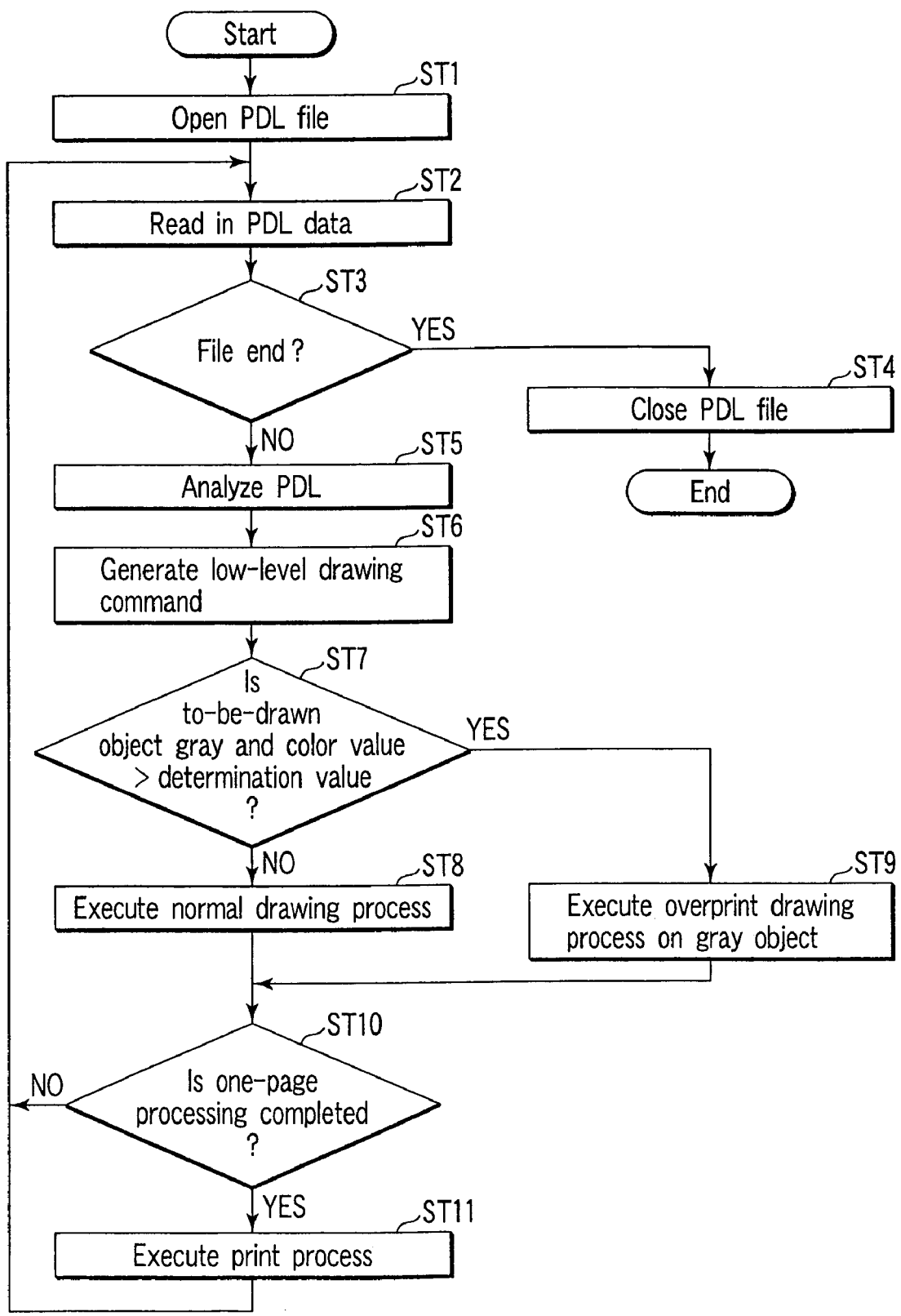
FIG. 2 is a flow chart illustrating a process operation of a printer controller.

Next, the process operation of the printer controller 10 with the above-described structure is described referring to a flow chart of FIG. 2.

To begin with, the PC 30, for instance, uses a printer driver to generate a PDL (PostScript 3, PCL_XL, etc.) file. The PDL file is delivered to the printer controller 10 via the network 20. The PDL file is temporarily stored as a file in the RAM 3 or HDD 4. Assume that the PDL file is stored in the HDD 4.

The CPU 1 in the printer controller 10 functions as a RIP (Raster Image Processor) to open the PDL file in the HDD 4 (ST1) and reads in the PDL file (PDL information) (ST2).

The CPU 1 determines whether there is a file end (ST3). If there is a file end, the CPU 1 closes the PDL file in the HDD 4 and finishes the process (ST4).

If there is no file end in step ST3, the CPU 1 analyzes the PDL file (ST5) and generates a low-level drawing command (display list) (ST6).

Then, the CPU 1 determines whether the generated low-level drawing command is associated with drawing of a gray object and whether the color value of the gray object is greater than a determination value (ST7). The determination value is preset on the basis of a type determination result with respect to the type (character, graphic, image) of an object to be drawn.

If "NO" in step ST7, the CPU 1 executes a normal drawing process (ST8).

If "YES" in step ST7, the CPU 1 executes an overprint drawing process on the gray object (ST9).

Figure 3:
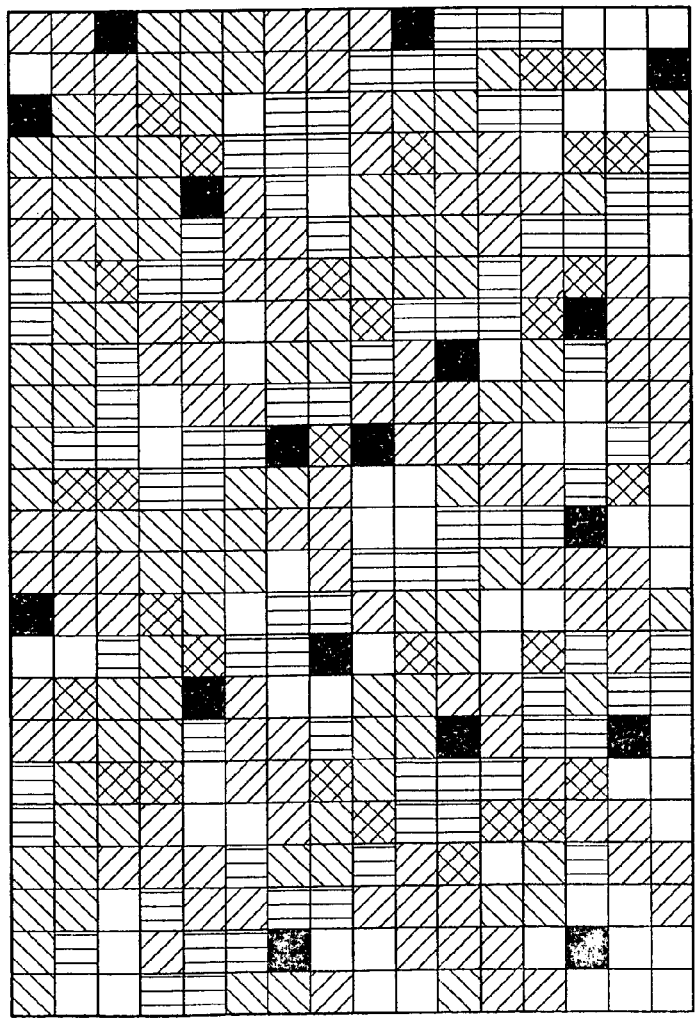
FIG. 3 shows a background prior to drawing, in a normal drawing process.
Figure 4:
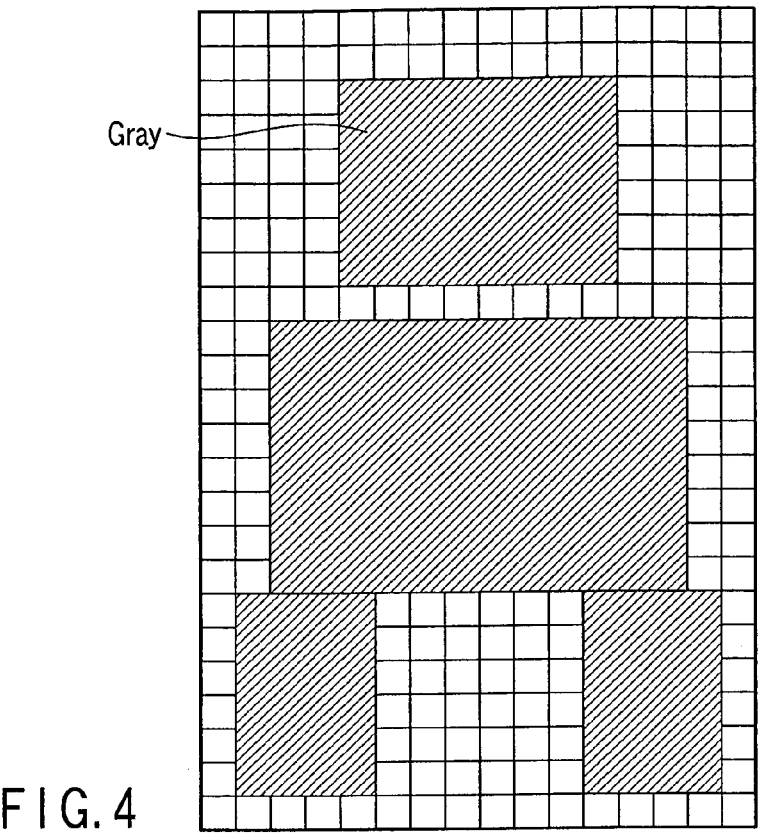
FIG. 4 shows a gray object in the normal drawing process.
Figure 5:
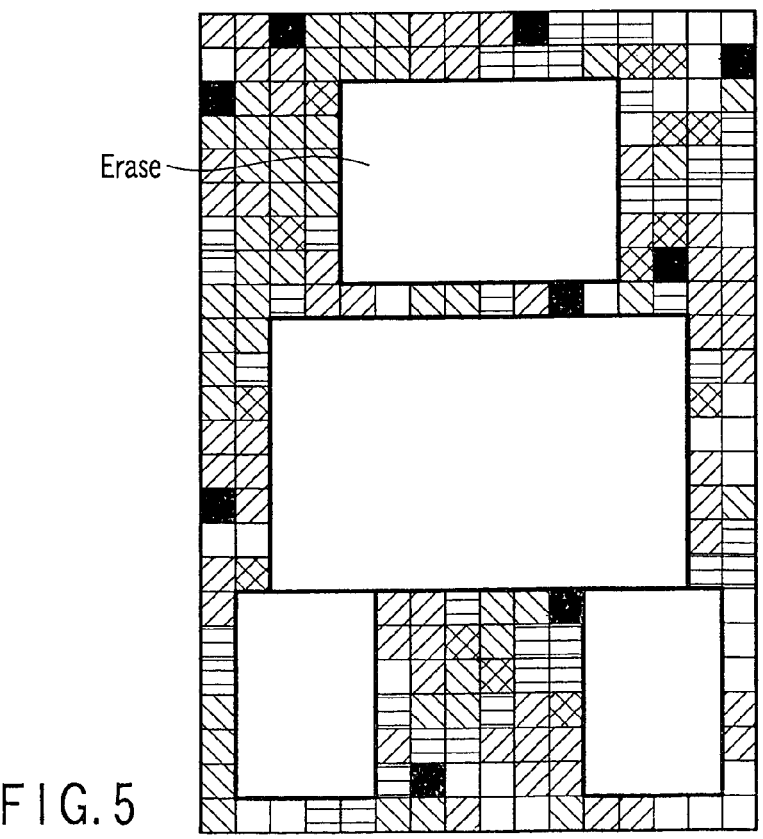
FIG. 5 shows a background that is normally processed in the normal drawing process.
Figure 8:
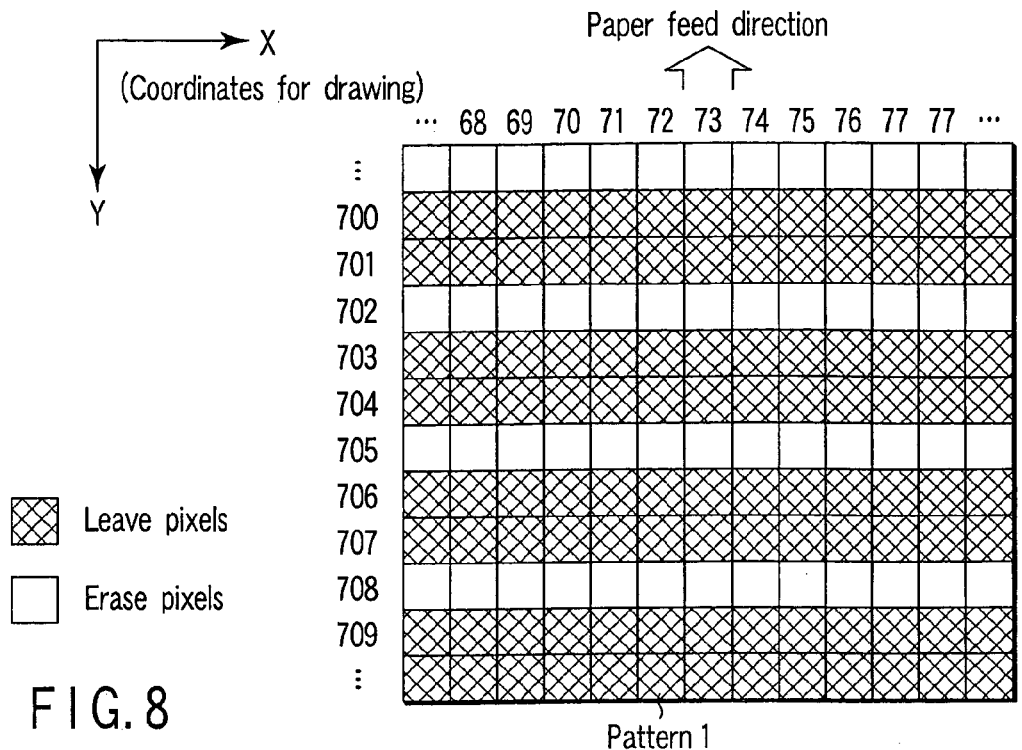
FIG. 8 shows a thinning-out pattern example according to pattern 1.
Figure 9:
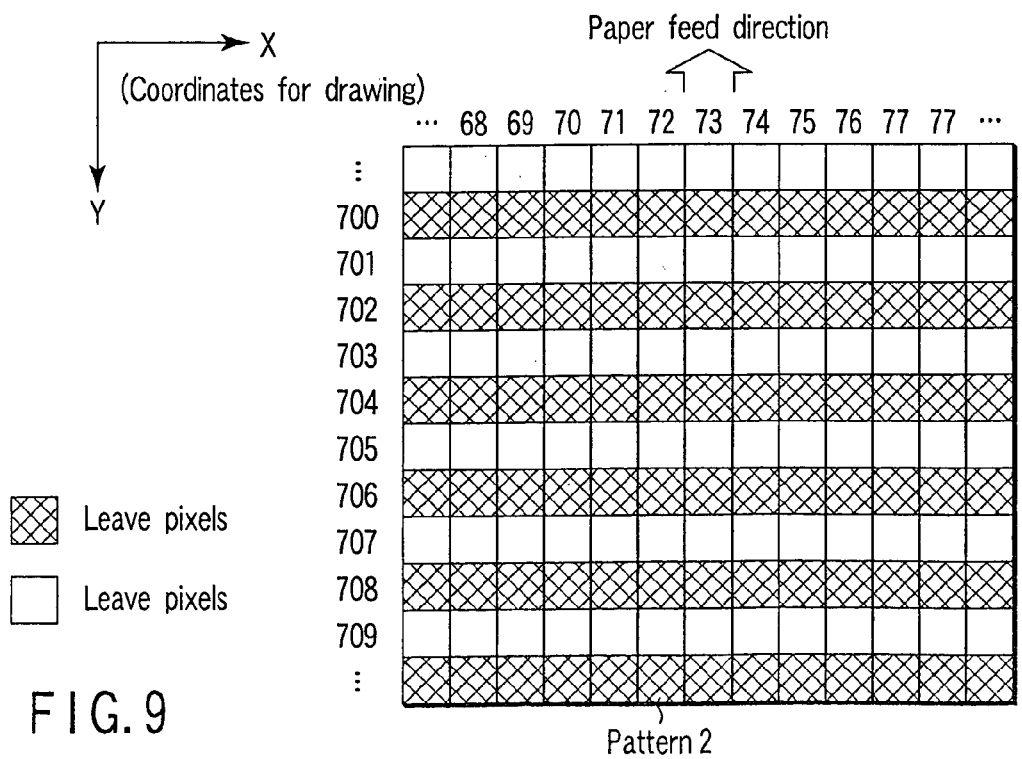
FIG. 9 shows a thinning-out pattern example according to pattern 2.
Figure 10:
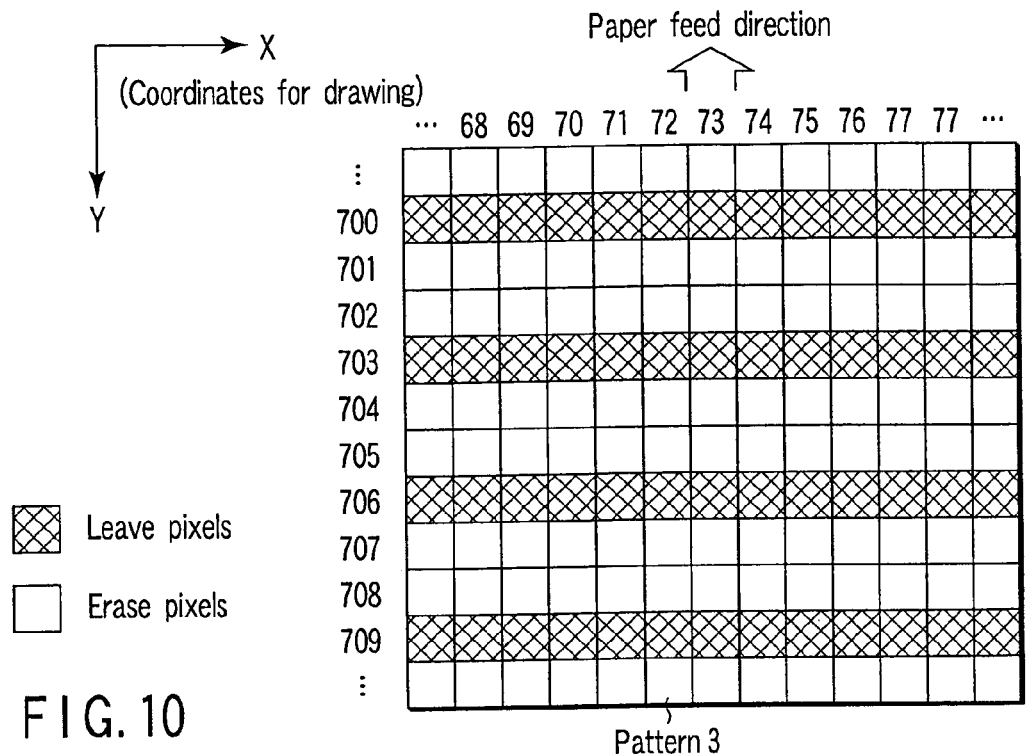
FIG. 10 shows a thinning-out pattern example according to pattern 3.
Figure 11:
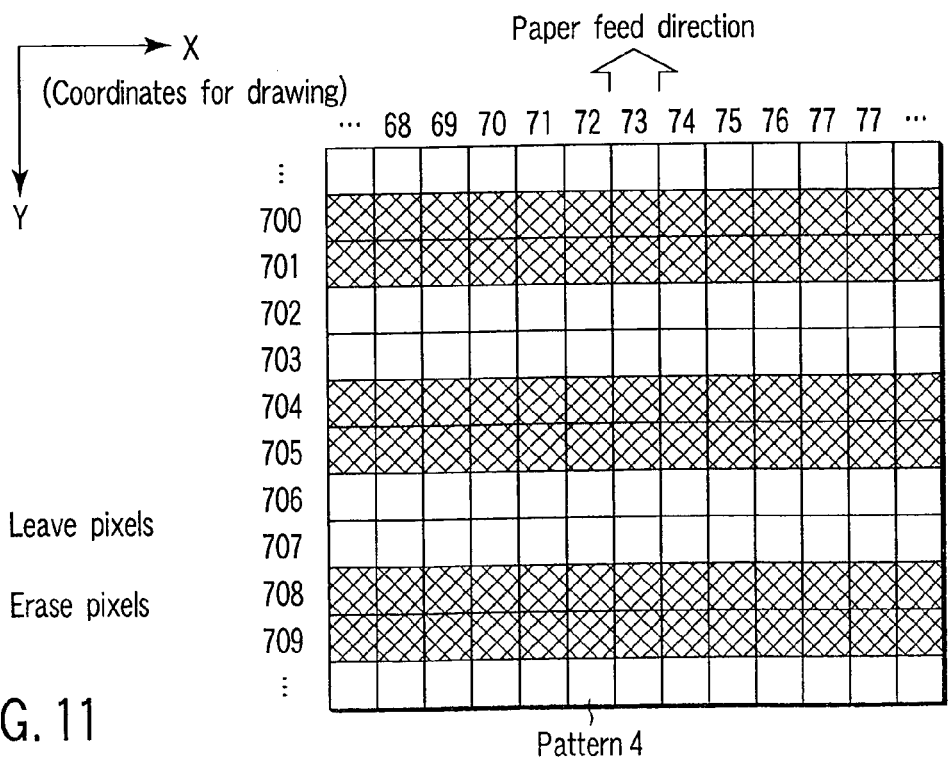
FIG. 11 shows a thinning-out pattern example according to pattern 4.

FIGS. 3 to 6 illustrate the normal drawing process. In the normal drawing process, overlapping portions between an already drawn background, as shown in FIG. 3, and an object that is to be drawn in gray, as shown in FIG. 4, are erased, as shown in FIG. 5. Then, a gray object is drawn, as shown in FIG. 6, on the background image information shown in FIG. 5. In this case, if misregistration occurs, white gaps occur conspicuously at boundary parts, as shown in FIG. 6.

In the present invention, in the case of an object that is to be drawn in gray, a gray overprint drawing process is executed to solve the above problem. In this process, a region overlapping the gray object is not entirely erased. A minimum limit in number of pixels, which causes no defect in a fixing process, is set, and a minimum necessary number of pixels are erased (i.e. thinned out). Thereby, the occurrence of white gaps due to misregistration can be suppressed without causing defective fixation.

A plurality of thinning-out patterns for erasure (erasure patterns) are prepared, and an optimal one of them is selected in consideration of various conditions. Thereby, a better print image quality is obtained.

FIG. 7 shows an example of a prepared thinning-pattern select table. A thinning-out pattern is determined by setting the kind of halftone screen, the kind of print medium and the kind of object to be drawn.

The thinning-out pattern select table can be customized. After the thinning-out pattern is determined, the background is thinned out (erased) according to the thinning-out pattern.

FIG. 8 to FIG. 13 show examples of thinning-out patterns.

In patterns 1, 2, 3 and 4 shown in FIGS. 8, 9, 10 and 11, data is thinned out in a direction perpendicular to the direction of paper feed. These patterns differ in that the cycle of thinning-out of data and the cycle of leaving data are varied.

Figure 12:
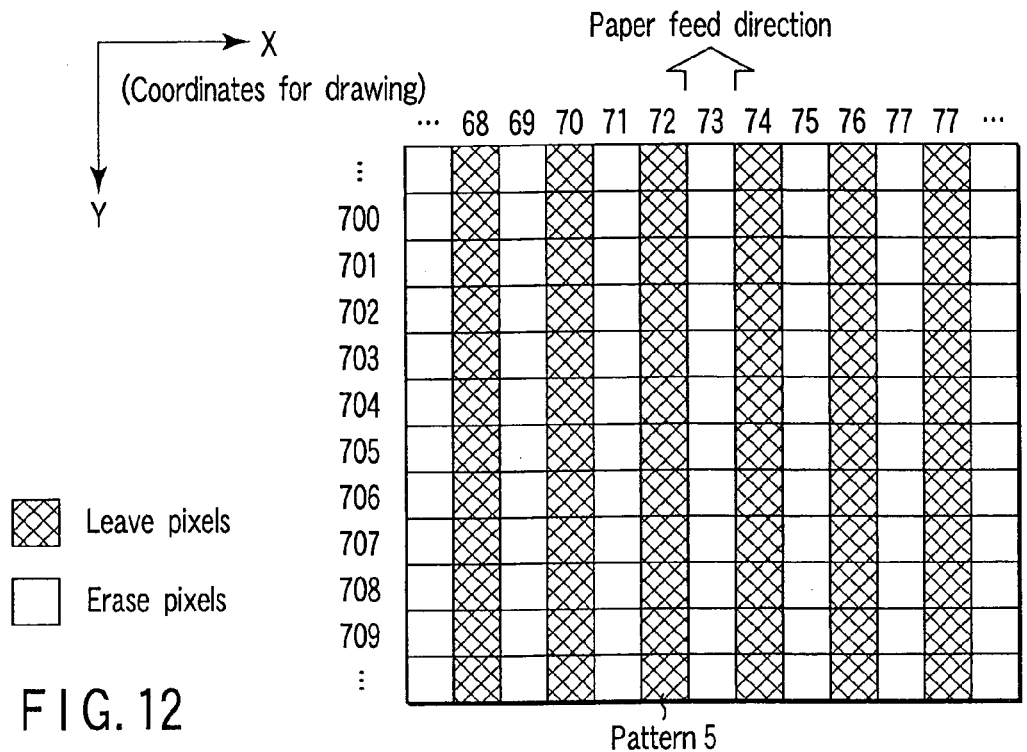
FIG. 12 shows a thinning-out pattern example according to pattern 5.

In pattern 5 shown in FIG. 12, data is thinned out in a horizontal direction in pattern 1. Its variations are also prepared, wherein the cycle of thinning-out of data and the cycle of leaving data are varied, like patterns 2 to 4 shown in FIGS. 9 to 11.

Figure 13:
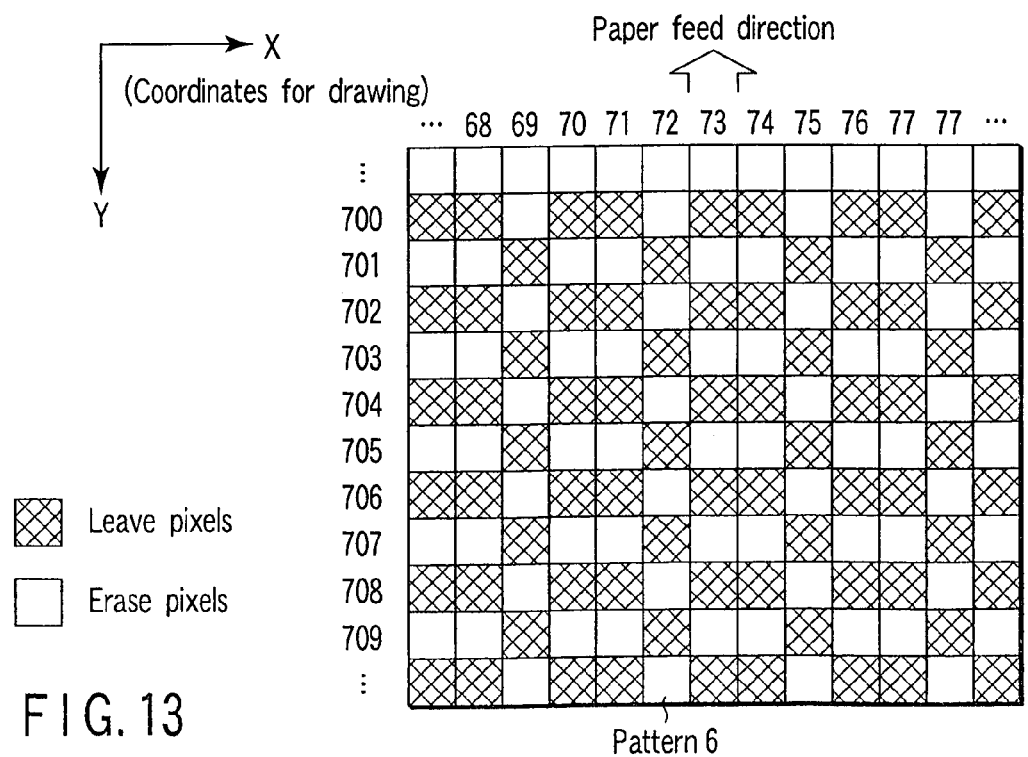
FIG. 13 shows a thinning-out pattern example according to pattern 6.

In pattern 6 shown in FIG. 13, cyclicity is provided by executing bit operations for the thinning-out pattern.

The patterns (1-6) are common in that high-speed processing can be performed since erasure is mechanically executed according to thinning-out patterns, regardless of background images.

Figure 14:
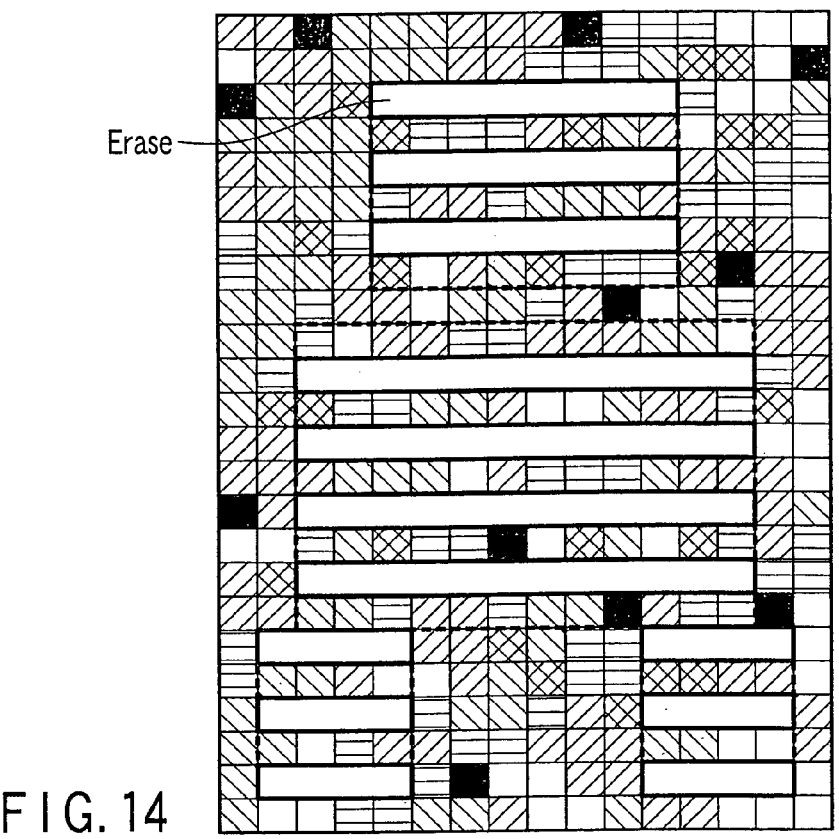
FIG. 14 shows an applied example of an overprint drawing process for gray.
Figure 15:
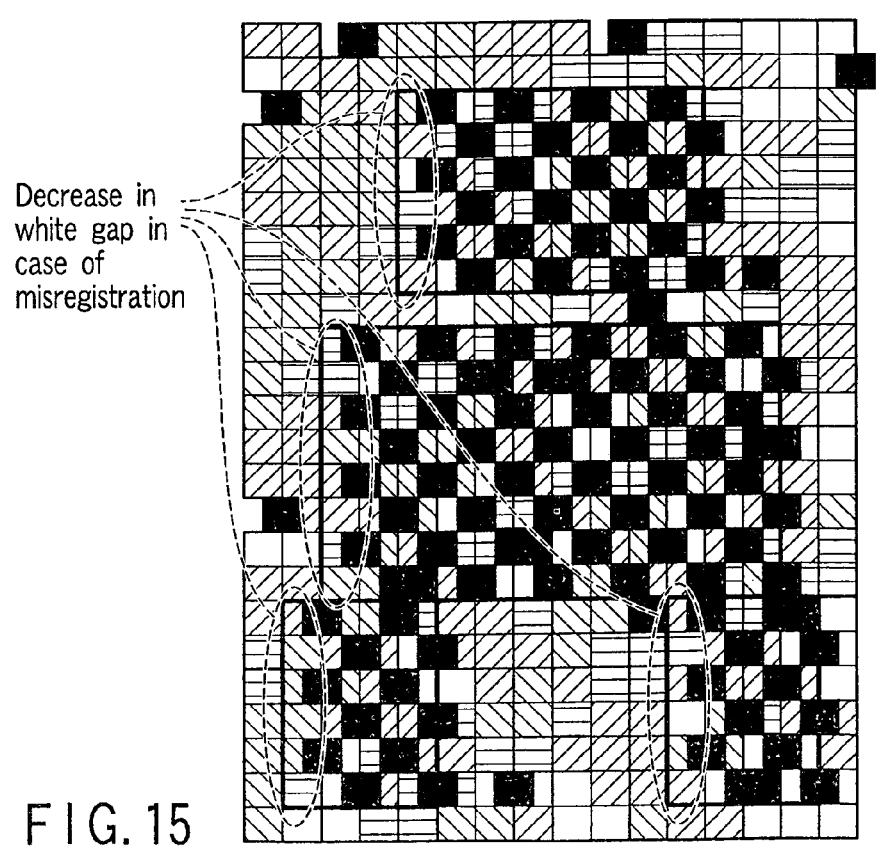
FIG. 15 shows an applied example of the overprint drawing process for gray.

FIGS. 14 and 15 show applied examples of the above-described gray overprint drawing process. Compared to FIGS. 3 and 4 already described above, FIG. 14 shows thinned-out parts, which are formed by applying the thinning-out pattern of FIG. 8. In this case, the locations for thinning-out are determined by absolute coordinates on the background, and not by start positions of drawing of objects. If erasure is executed using the object start positions, disturbance would occur in the thinning-out pattern.

FIG. 15 shows a final result. Even if misregistration occurs, parts of the background image remain on the left side of the gray object, and white gaps become less conspicuous.

In addition, since the background image is thinned out, as shown in FIG. 14, the amount of toner is decreased and no defect in fixing occurs. In the case of a print medium that requires stricter conditions, the amount of thinning-out is increased. On the other hand, in the case of a print medium that requires relaxed conditions, the amount of thinning-out is decreased. This method can prevent occurrence of a white gap due to misregistration and can prevent, at the same time, a defect in fixation of toner.

FIG. 16 shows an example of decision of thinning-out pattern selection on the thinning-out pattern select table shown in FIG. 7. In the example of decision shown in FIG. 16, the thinning-out pattern is determined based on factors: the color conversion type, print medium, print direction, and gray object size determination result.

The color conversion kind is one of factors that determine the appearance of an output image. By switching the thinning-out pattern based on the color conversion type, a good print image quality is obtained.

The thinning-out pattern based on the print direction is effective when misregistration occurs principally in a paper feed direction or a direction perpendicular to the paper feed direction.

When the background is thinned out, the following cases may occur depending on thinning-out patterns. That is, owing to the cycle of thinning-out, a small object may not be thinned out, or a white gap increases with no advantageous effect of black overprint. Such improper application of thinning-out can be avoided by determining the thinning-out pattern on the basis of the determination result of gray object size.

After step ST8 or step ST9, the CPU 1 checks whether processing for one page is completed (ST10).

If the processing for one page is completed in step ST10, the CPU 1 executes a print process using the printer engine 11 (ST11) and returns to ST2.

If the processing for one page is not completed in step ST10, the CPU 1 returns to step ST2.

Next, another embodiment of the invention is described.

This embodiment is characterized in that pixels to be thinned out are determined by masking based on a halftone pattern of a gray object and a thinning-out pattern.

An example of this another process will now be described referring to a flow chart of FIG. 17. Steps ST21 to ST28 are common to steps ST1 to ST8, so a description is omitted here.

If "YES" in step ST27, the CPU 1 subjects the gray object to a halftone process (ST29).

Then, the CPU 1 executes a thinning-out process on pixels with value "ON" of halftone-processed gray object from the background image (ST30), and subjects the gray object to an overprint drawing process (ST31).

After the normal drawing process in step ST28 or the overprint drawing process in step ST31, the CPU 1 checks whether processing for one page is completed (ST32).

If the processing for one page is completed in step ST32, the CPU 1 executes a print process using the printer engine 11 (ST33) and returns to ST22.

If the processing for one page is not completed in step ST32, the CPU 1 returns to step ST22.

In the present embodiment, after it is determined that the low-level drawing command is the object of the overprint process, a halftone process for the gray object, as illustrated in FIG. 18, is executed.

Figure 19:
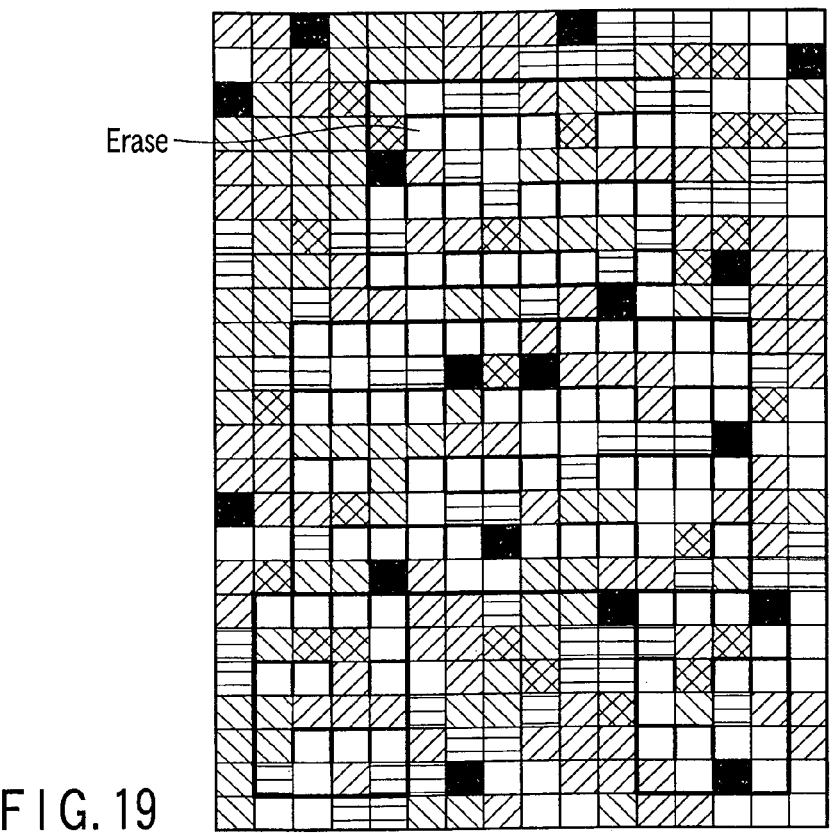
FIG. 19 illustrates a thinning-out process using a half-tone pattern.

Thereafter, as shown in FIG. 19, the halftone-processed gray object and the thinned-out pattern are subjected to a mask process, and pixels to be thinned out are determined on the basis of the pixel value "ON" of bits of the gray object.

Figure 20:
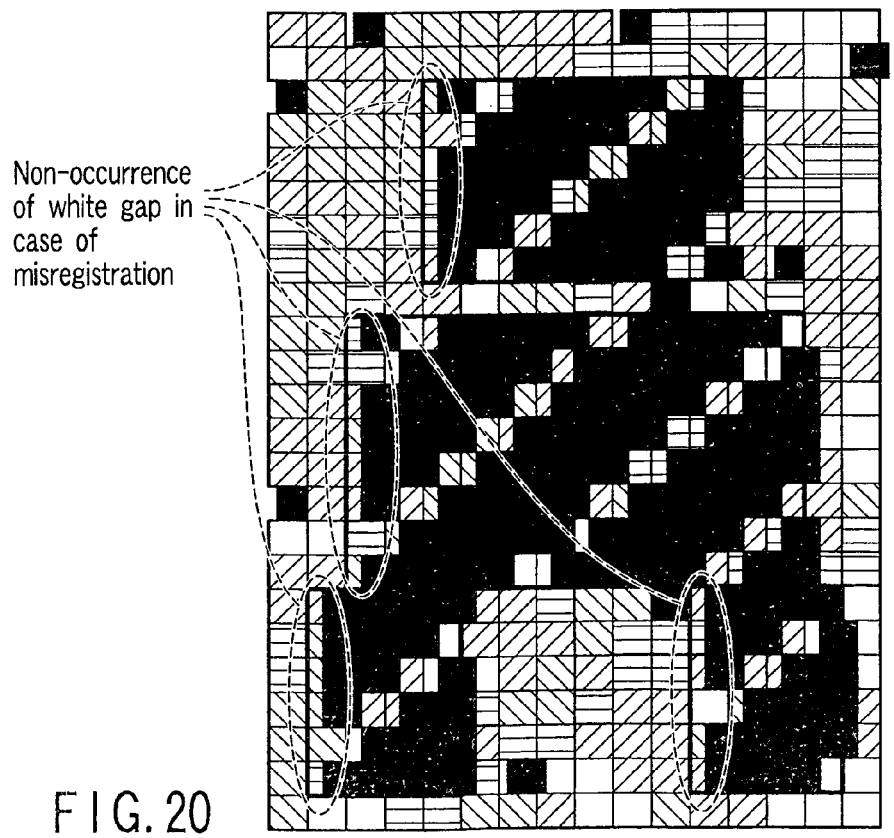
FIG. 20 shows a result of drawing of a gray object.

Subsequently, as shown in FIG. 20, the overprint drawing process is executed to print the gray object over the background.

By executing the process of determining the to-be-thinned-out region, it becomes possible to prevent an unnecessary decrease in density of the gray part, which would occur by thinning out background pixels on which the gray object is not drawn.

An alternative first structure of the present embodiment may be adopted. In this first structure, a halftone process result at a predetermined density may be used for the halftone pattern that is employed in the mask process. Thereby, a predetermined value can be used to determine the thinning-out pattern for the gray object, and a high-speed operation can be realized.

An alternatively second structure of the present embodiment may be adopted. In the second structure, when to-be-thinned-out pixels are to be determined, it is possible to execute a mask process based on the thinning-out pattern and a bit-inversion process result of the halftone process result. In this case, a toner attachment amount can be reduced when the gray level is relatively low.

Furthermore, the first structure and second structure may be combined to use the inversion result of the halftone process result at a specific density in order to determine the to-be-thinned-out pixels.

In another example of the present embodiment, it is possible to execute a pixel thinning-out process by simply applying the gray level of the to-be-drawn object to the background part of the gray object with use of a thinning-out pattern.

Figure 17:
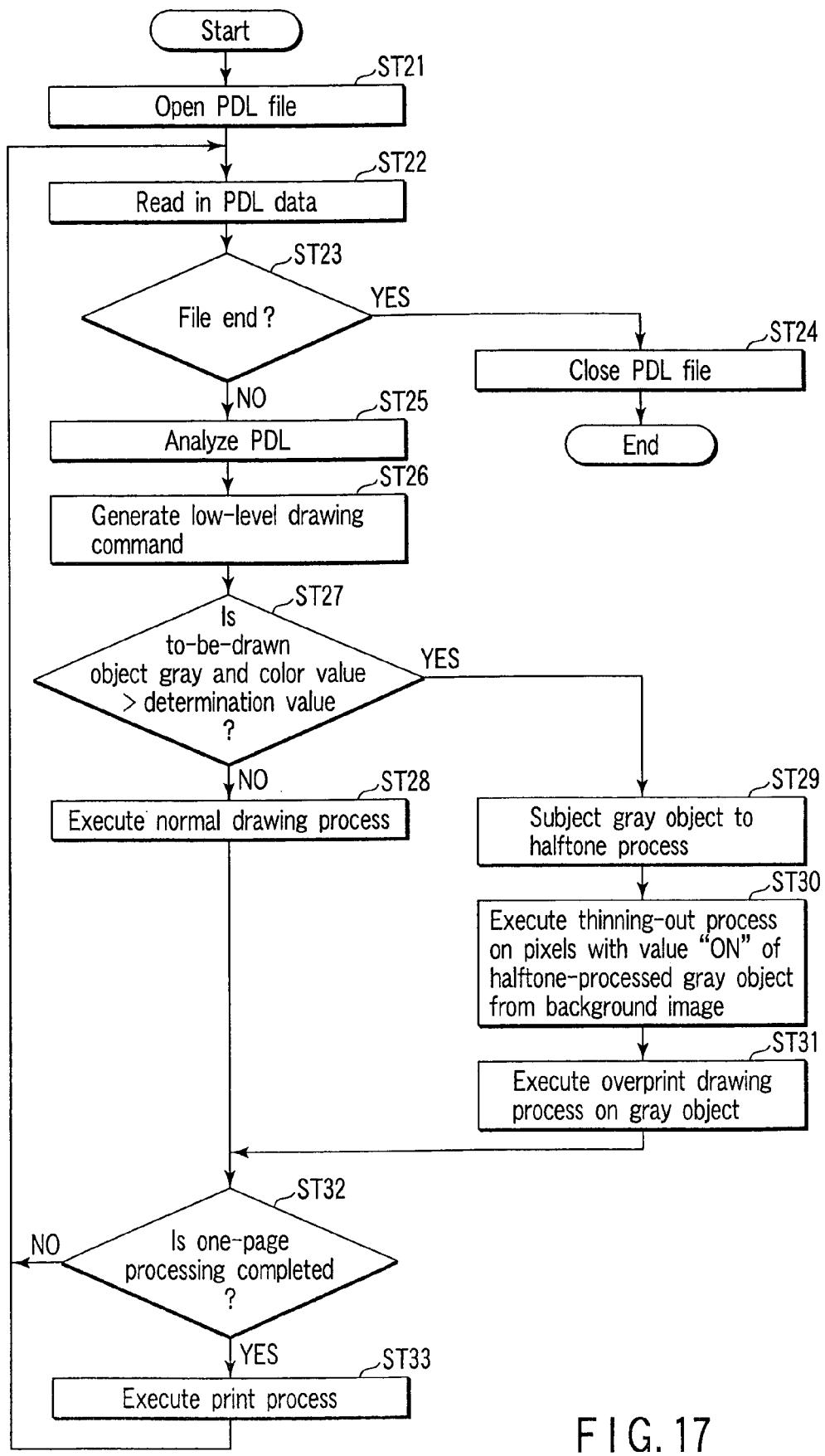
FIG. 17 is a flow chart illustrating another process operation of the printer controller.

In the above-described flow-charts of FIGS. 2 and 17, the normal drawing process or the gray object drawing process is executed each time the low-level drawing command is produced. Alternatively, low-level drawing commands may be produced in units of a page or a job, following which the low-level drawing commands may be subjected to the drawing process as a batch.

As has been described above, according to the embodiments of the present invention, the overprint process for the gray object can be executed while preventing such a problem that the color of the background image shows through.

Besides, it is possible to prevent the toner attachment amount of a formed image from exceeding a tolerable limit, and to make less visible a white gap due to color misregistration at an edge part of a gray object.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus that forms a color image, comprising:

determination means for determining whether image data of an object to be drawn is composed of gray data and a color value of the object is greater than a determination value;

erase means for erasing, if the determination means determines that the image data of the object to be drawn is composed of gray data and the color value of the object is greater than the determination value, image data of a background region that overlaps a drawing region of the to-be-drawn gray object on the basis of a preselected erasure pattern; and drawing means for drawing the gray object using the image data of the background region that is erased by the erase means.

2. The image forming apparatus according to claim 1, wherein the determination means determines the kind of the to-be-drawn object, and presets the determination value in accordance with a result of the determination of the kind.

3. The image forming apparatus according to claim 2, wherein the kind of the to-be-drawn object is a character, a graphic, or an image.

4. The image forming apparatus according to claim 1, wherein the erase means includes a select means for preselecting one of a plurality of erasure patterns, which are prepared in advance, in accordance with conditions.

5. The image forming apparatus according to claim 4, wherein the select means selects one of the plurality of erasure patterns in accordance with conditions including the kind of halftone screen, the kind of print medium, and the kind of to-be-drawn object.

6. The image forming apparatus according to claim 4, wherein the select means is capable of changing the plurality of erasure patterns that are prepared in advance, and the conditions for selection.

7. An image forming apparatus that forms a color image, comprising:

determination means for determining whether image data of an object to be drawn is composed of gray data and a color value of the object is greater than a determination value;

process means for subjecting the to-be-drawn object to a halftone process if the determination means determines that the image data of the to-be-drawn object is composed of gray data and the color value of the object is greater than the determination value;

erase means for erasing image data of a background region that overlaps a drawing region of the to-be-drawn gray object on the basis of a mask result that is obtained from the halftone process result of the gray object processed by the process means and a preselected erasure pattern; and drawing means for drawing the gray object using the image data of the background region that is erased by the erase means.

8. The image forming apparatus according to claim 7, wherein the erase means erases the image data of the background region that overlaps the drawing region of the to-be-drawn gray object on the basis of a mask result that is obtained from a bit-inversion result of the halftone process result of the gray object, which is processed by the process means, and the preselected erasure pattern.

9. The image forming apparatus according to claim 7, wherein the erase means erases the image data of the background region that overlaps the drawing region of the to-be-drawn gray object on the basis of a mask result that is obtained from the halftone process result of the gray object with a predetermined density and the preselected erasure pattern.

10. The image forming apparatus according to claim 7, wherein the erase means erases the image data of the background region that overlaps the drawing region of the to-be-drawn gray object on the basis of a mask result that is obtained from a bit-inversion result of the halftone process result of the gray object with a predetermined density and the preselected erasure pattern.

11. Computer readable medium encoded with a computer program that causes an image forming apparatus, which forms a color image, to execute a process, comprising:

determining whether image data of an object to be drawn is composed of gray data and a color value of the object is greater than a determination value;

erasing, if it is determined that the image data of the object to be drawn is composed of gray data and the color value of the object is greater than the determination value, image data of a background region that overlaps a drawing region of the to-be-drawn gray object on the basis of a preselected erasure pattern; and drawing the gray object using the image data of the background region that is erased.

12. Computer readable medium encoded with a computer program that causes an image forming apparatus, which forms a color image, to execute a process, comprising:

determining whether image data of an object to be drawn is composed of gray data and a color value of the object is greater than a determination value;

subjecting the to-be-drawn object to a halftone process if it is determined that the image data of the to-be-drawn object is composed of gray data and the color value of the object is greater than the determination value;

erasing image data of a background region that overlaps a drawing region of the to-be-drawn gray object on the basis of a mask result that is obtained from the halftone process result of the processed gray object and a preselected erasure pattern; and drawing the gray object using the image data of the background region that is erased.

* * * * *